United States Patent
Svensson et al.

(10) Patent No.: US 9,441,559 B2
(45) Date of Patent: Sep. 13, 2016

(54) COMPRESSOR PRE-SPIN CONTROL METHOD

(71) Applicant: VOLVO CAR CORPORATION, Gothenburg (SE)

(72) Inventors: Johan Svensson, Gothenburg (SE); Mattias Carlen, Gothenburg (SE)

(73) Assignee: VOLVO CAR CORPORATION (SE)

( * ) Notice: Subject to any disclaimer, the term of this patent is extended or adjusted under 35 U.S.C. 154(b) by 159 days.

(21) Appl. No.: 14/535,670

(22) Filed: Nov. 7, 2014

(65) Prior Publication Data

US 2015/0134229 A1    May 14, 2015

(30) Foreign Application Priority Data

Nov. 8, 2013 (EP) .................................. 13192050

(51) Int. Cl.
*F02D 41/00* (2006.01)
*F02B 37/04* (2006.01)
*F02B 39/12* (2006.01)
(Continued)

(52) U.S. Cl.
CPC ........... *F02D 41/0007* (2013.01); *F02B 37/04* (2013.01); *F02B 37/12* (2013.01); *F02B 37/127* (2013.01); *F02B 37/16* (2013.01); *F02B 39/12* (2013.01); *F02D 23/005* (2013.01); *F02B 2037/125* (2013.01); *F02B 2037/162* (2013.01); *F02D 41/18* (2013.01); *F02D 2009/0279* (2013.01); *F02D 2009/0283* (2013.01); *F02D 2200/0402* (2013.01);
(Continued)

(58) Field of Classification Search
CPC .... F02D 41/00; F02D 41/18; F02D 41/0007; F02B 37/16; F02B 37/12; F02B 37/04; F02B 39/12; F02B 23/005; F02B 37/127; F02B 2037/162; F02B 2037/125
See application file for complete search history.

(56) References Cited

U.S. PATENT DOCUMENTS 4,551,977 A * 11/1985 Matsumura ........... F02B 33/446
                                                              60/611
8,165,781 B2 * 4/2012 Johnson ................. F02M 37/00
                                                              123/518

FOREIGN PATENT DOCUMENTS

DE  102004024949 A1 * 12/2005 ........... F01D 17/105
JP       11324692 A    11/1999
WO     2008017952 A1   2/2008

OTHER PUBLICATIONS

Extended European Search Report Dated Apr. 11, 2014, Application No. 13192050.6-1606, Applicant Volvo Car Corporation, 4 Pages.

*Primary Examiner* — Hieu T Vo
(74) *Attorney, Agent, or Firm* — Brooks Kushman P.C.

(57) ABSTRACT

A method is provided for controlling a pre-spin operation of a compressor of an internal combustion engine provided with a turbocharger. The presence of a turbocharger imposes additional requirements on the method. The wear of a compressor clutch is proportional to the transferred energy when the clutch is engaged. In order to reduce the wear of the compressor clutch, or increase the maximum engine speed where it is allowed to engage the compressor, a compressor pre-spin operation is used to reduce the transferred energy when the clutch is engaged. The pre-spin is achieved by controlling the air mass flow over the compressor by controlling a bypass throttle angle of a bypass throttle. The bypass throttle is provided in a parallel conduit to the compressor, bypassing the compressor. Since the air mass flow over the compressor affects the air mass flow to the turbocharger, the method takes the turbocharger into consideration.

20 Claims, 2 Drawing Sheets

(51) Int. Cl.
*F02D 23/00* (2006.01)
*F02B 37/16* (2006.01)
*F02B 37/12* (2006.01)
*F02D 9/02* (2006.01)
*F02D 41/18* (2006.01)

(52) U.S. Cl.
CPC ............... *F02D 2200/0406* (2013.01); *F02D 2200/0414* (2013.01); *Y02T 10/144* (2013.01)

COMPRESSOR PRE-SPIN CONTROL METHOD

CROSS-REFERENCE TO RELATED APPLICATIONS

This application claims foreign priority benefits under 35 U.S.C. §119(a)-(d) to European patent application number EP 13192050.6, filed Nov. 8, 2013, which is incorporated by reference in its entirety.

TECHNICAL FIELD

The present disclosure relates to a method to control a pre-spin operation of a compressor of an internal combustion engine.

BACKGROUND

The use of compressors or superchargers is a well-known approach in order to increase the pressure and air density of air supplied to the internal combustion engine. The increased amount of air provides a greater amount of oxygen per engine cycle which in turn enables that the injected amount of fuel can be increased, resulting in that more power can be produced by the engine.

When the compressor clutch is engaged, the speed of the compressor is generally relatively low whereas the speed of the crankshaft that the compressor is engaged to is relatively high. Thus, there is a big difference between the speed of the crankshaft and the compressor. The larger the difference between the speed of the crankshaft and the speed of the compressor is when the compressor clutch is engaged, the larger is the amount of energy that instantly is transferred over the compressor clutch. High energy transfer during engaging of the compressor clutch causes high wear of the compressor clutch.

A typical approach in order to improve durability of the compressor clutch is to only allow engagement of the compressor clutch when the difference between the speed of the compressor and the speed of the crankshaft is within a limited range. This severely restricts the driving conditions where it is allowed to use the compressor.

For internal combustion engines provided with turbochargers also other aspects are important to consider when controlling the compressor. Since the air mass flow over the compressor highly affects the air mass flow to the subsequently provided turbocharger, it is important that the compressor do not stall the turbocharger. Hence, there is a need for an improved control method.

SUMMARY

An object of the present disclosure is to provide an improved method for controlling a pre-spin operation of a compressor of an internal combustion engine provided with turbocharger.

The method is intended to be applied in a vehicle with an internal combustion engine, wherein the internal combustion engine at least comprises an air intake, a compressor conduit, a bypass conduit and a turbocharger. The air intake is provided as an air supplying opening for the internal combustion engine. From the air intake an air conduit is provided, directing the air mass flow, to a splitting point where the air conduit is divided into the compressor conduit and the bypass conduit.

The compressor conduit comprises a compressor and is arranged between the air intake and the subsequently provided turbocharger such that the compressor is in fluid communication with the air intake and the turbocharger. The bypass conduit comprises a bypass throttle and is arranged in fluid communication with the air intake and the turbocharger such that the bypass conduit bypasses the compressor. Downstream of the compressor of the compressor conduit and downstream of the throttle of the bypass conduit, but upstream of the turbocharger, the compressor conduit and the bypass conduit merge in a merging point.

The compressor is directly or indirectly connected to a crankshaft of the internal combustion engine by a compressor clutch such that the compressor can be engaged and disengaged from the crankshaft. When the compressor clutch is engaged the crankshaft is connected to the compressor such that the crankshaft directly or indirectly drives the compressor. When the compressor is engaged more air is supplied to the combustion chamber. However, the functionality of the compressor is not part of the disclosure, thus is not further disclosed herein.

The bypass throttle can be controlled by setting a bypass throttle angle such that the bypass throttle can be controlled between an open and a closed position. The position of the bypass throttle determines the air mass flow that passes the bypass throttle and the compressor respectively. The back pressure for the bypass throttle is lower than the back pressure for the compressor if the bypass throttle is fully open. Thus, when the bypass throttle is fully open maximal air mass flow passes the bypass throttle. If the bypass throttle is completely closed no air mass flow can pass the bypass throttle, and the entire air mass flow passes the compressor. Hence, the more closed the bypass throttle is, the more air mass flow will pass the compressor.

Controlling a pre-spin operation of a compressor where a turbocharger is present imposes additional requirements of the control method since the air mass flow over the compressor also affects the air mass flow over the turbocharger, which in turn affects the air supplied to the combustion chamber of the internal combustion engine. The air supplied to the combustion chamber affects the amount of fuel that can be injected which affects the amount of power that can be produced by the internal combustion engine. The produced power and the power requested by the driver affect how the internal combustion engine is running and the activation of the turbocharger and the compressor. If the turbocharger is active or not is one of the aspects that highly affects the method for controlling the pre-spin operation. If the turbocharger is not activated it is possible to allow higher pressure difference over the compressor since this does not affect the inactive turbocharger. If the turbocharger is active lower pressure difference is allowed. If the turbocharger is active and the pressure difference over the compressor is relatively high, the air mass flow that is supplied to the turbocharger might be insufficient for the turbocharger to work properly.

Consequently, during some driving conditions it is highly important that the compressor and the turbocharger are controlled with respect of each other. If e.g., the turbocharger is running, and is running at speeds where a substantial amount of air continuously is being supplied to the combustion chamber, and the pre-spin operation of the compressor is initiated the increased pressure difference over the compressor may result in that the turbocharger is not supplied with sufficient air mass flow. This is handled by the method in that a trade-off between speeding up the compressor and turbocharger performance is performed.

The requested compressor speed and/or the air mass flow over the compressor, which is used to calculate the bypass throttle angle, is obtained during testing as a function of engine speed and engine load. If the turbocharger is active a larger margin is used when calculating and setting the bypass throttle angle such that no or allowable choking of the turbocharger is achieved. Consequently, by applying the method the turbocharger is taken in consideration when controlling the compressor such that e.g., unwanted choking can be avoided.

Initially the method comprises checking a number of pre-set conditions that has to be fulfilled in order for the pre-spin operation to be performed. Such pre-set conditions are e.g., checking if: the compressor clutch is in a disengaged state, the internal combustion engine load is in a predetermined load range, the air mass flow delivered by the turbocharger is within a predetermined mass flow range, the compressor speed is below a threshold value and the bypass throttle is at least partially open. If the compressor clutch is already engaged the method is not applied. Neither is the method applied if the current load of the internal combustion engine is not within a predetermined load range. If the air mass flow currently delivered by the turbocharger is not within a predetermined mass flow range, such as being above a limit where initiating pre-spin will have negative impact on the turbocharger, the pre-spin operation is not initiated. If the speed of the compressor is above a set threshold value, such as e.g., if the compressor recently has been in an engaged state, the pre-spin operation is not applied.

If the pre-set conditions are fulfilled the calculating of a bypass throttle angle dependent on at least a mass flow over the engine and a target pressure difference over the compressor is performed. The bypass throttle angle is calculated such that; a predetermined pre-spin of said compressor is achieved, the internal combustion engine load stays within the predetermined load range and the air mass flow delivered by the turbocharger stays within the predetermined mass flow range. When the bypass throttle angle has been calculated the bypass throttle angle is set according to what has been calculated. According to the method, if the pre-set conditions are fulfilled the bypass throttle angle is calculated such that when the bypass throttle is set according to the calculated angle the pre-spin operation will be performed, and the internal combustion engine load and the air mass flow delivered by the turbocharger will be kept within ranges such that said pre-spin of the compressor can be maintained.

Speeding up the compressor by setting the bypass throttle according to the calculated bypass throttle angle before the compressor clutch is engaged will reduce the speed difference between the crankshaft of the internal combustion engine and the compressor. The energy amount that instantly is transferred from the crankshaft to the compressor when the compressor clutch is engaged is proportional to the speed difference. By reducing the transferred energy the durability of the compressor clutch can be improved or it is possible to allow the compressor to be engaged at a higher maximum crankshaft speed without excessive wear of the compressor clutch.

However, checking the number of conditions as according to the method and calculating the bypass throttle angle as according to the method also gives the advantage of that the pre-spin operation can be initiated also when the internal combustion engine is provided with a turbocharger, without impairing the power output of the internal combustion engine. By controlling the throttle bypass angle such that, within the range it is possible to control, the engine load stays in the predetermined load range and the air mass flow delivered by the turbo charger stays within the predetermined mass flow range the method also ensures that the pre-spin operation is maintained. Thus, by implementing the method it is possible to increase the maximum engine speed where the compressor can be engaged and maintaining the pre-spin of the compressor.

With the method it is possible to reduce the amount of energy that is transferred when the compressor clutch is engaged by approximately 20%, or even higher if the pre-spin operation also is allowed to have a slightly limiting effect on the turbocharger.

The compressor may subsequently be engaged when a compressor engagement request is issued. However, the method used to control the compressor engagement is not part of this disclosure.

According to one aspect of the method also other pre-set conditions may be added in order to decide if and when the pre-spin operation should be performed. E.g., internal combustion engines are generally connected to transmissions, and according to one development of the method it comprises an additional pre-set condition of checking if one of a number of predefined gears of a transmission is engaged. By adding this feature to the method it is possible to restrict the pre-spin operation to be performed when certain gears are selected. It might e.g., not be appropriate to initiate the pre-spin operation when the transmission is set in reverse.

The throttle bypass angle is dependent on the current air mass flow over the bypass throttle. It is possible to use this dependence in order to be able to calculate the throttle bypass angle more accurate. Hence, according to one aspect of the method the air mass flow over the bypass throttle is taken in consideration while calculating the bypass throttle angle. According to a further aspect of the method the internal combustion engine additionally comprises a temperature sensor. The temperature sensor is provided downstream of the air intake and upstream of the splitting point of the compressor conduits and the bypass conduit, such that a compressor inlet temperature can be measured in the air mass flow. The method comprises measuring the compressor inlet temperature and using the measured compressor inlet temperature in order to calculate the bypass throttle angle. The performance of the turbocharger, as well as the performance of the compressor, is dependent on ambient pressure and temperature. If a turbocharger is present the method for controlling the pre-spin functionality needs to consider these parameters both in respect of the compressor and in respect of the turbocharger. The ambient temperature affects the ambient pressure and also the oxygen content of the air, which affects the combustion efficiency and the turbocharger according to known physics. The higher the air temperature is, the faster must the turbocharger spin, due to the decreased air density, in order to supply the combustion engine with the same amount of oxygen. Thus by adding this parameter the accuracy of the throttle bypass calculation may be improved.

One possible approach according to the method to calculate the bypass throttle angle, referred to as BT-$\alpha$, is to use a throttle position equation:

$$BT-\alpha = f(\dot{m}\ bypass(t) * \sqrt{RTus}/(Cd*Pus)*f(Pratio)),$$
wherein $$\dot{m}\ bypass(t) = \dot{m}\ engine(t) - \dot{m}\ comp\ target(t), \text{ and}$$
wherein BT-$\alpha$=the requested angle of the bypass throttle,
$\dot{m}$ bypass(t)=current mass flow over the bypass throttle at the time t, R=the gas constant, approximately 287 J/KgK, Tus=the temperature measured by the temperature sensor upstream of the compressor, Cd=discharge coefficient for the throttle, which is a specific for the present throttle, Pus=requested pressure downstream of the merging point. The requested pressure may e.g., be based on a pressure upstream of the splitting point which is obtained during testing and an additional offset value, wherein the pressure upstream of the splitting point and the offset value generates, in relation to the requested pressure downstream of the merging point, a requested up speeding of the compressor, Pratio=the target pressure difference over the compressor, wherein the pressure difference e.g., may be determined from data obtained during testing, $\dot{m}$ engine (t)=the mass flow over the engine at the time t, wherein the mass flow over the engine e.g., may be calculated based on a number of parameters, $\dot{m}$ comp target(t)=the requested mass flow over the compressor at the time t, wherein the requested mass flow over the compressor e.g., may be obtained during testing as a function of engine speed and engine load. This example of a throttle position equation utilizes both the air mass flow over the bypass throttle at a certain time t, $\dot{m}$ bypass(t), which is calculated according to the method by using the mass flow over the engine, $\dot{m}$ engine(t), at a certain time t and the requested mass flow over the compressor, $\dot{m}$ comp target(t), at a certain time t and temperature in order to be able to calculate an accurate throttle bypass angle, BT-α.

However, in order to improve the accuracy of the throttle bypass angle calculation further a feedback functionality can be used. According to one aspect, the internal combustion engine may additionally comprise a turbocharger inlet pressure sensor. The turbocharger inlet pressure sensor is provided downstream of the merging point where the compressor conduit and the bypass conduit merge and upstream of the turbocharger such that a turbocharger inlet actual pressure can be measured in the air mass flow. The feedback functionality is based on the actual measured turbocharger inlet actual pressure, and the feedback functionality enables that the mass flow over the throttle continuously can be updated by adding a calculated feedback mass flow over the throttle to the current mass flow over the throttle. Hence, the feedback functionality of the method comprises calculating the current feedback mass flow over the throttle at a certain time t and subsequently adding the calculated feedback mass flow over the throttle to the current mass flow over the throttle. Consequently, according to the method a new, corrected mass flow over the throttle is calculated according to:

$$\dot{m}\text{ bypass}(t+1)=\dot{m}\text{ bypass}(t)+\dot{m}\text{ feedback bypass}(t),$$

wherein $\dot{m}$ bypass(t+1)=the new corrected mass flow over the throttle at the time (t+1), $\dot{m}$ bypass (t)=the current mass flow over the throttle at the time t, and $\dot{m}$ feedback bypass(t)=the calculated feed-back mass flow over the throttle at the time t.

The feedback functionality uses the functionality of a PID regulator where amongst others the actual turbocharger inlet pressure is used as input. According to this aspect of the method, except for measuring the turbocharger inlet pressure, the method comprises calculating the feedback mass flow over the compressor by using a feedback equation according to:

$$\dot{m}\text{ feedback bypass}(t) = Kp(r(t) - y(t)) + \int_0^t Ki(r(\tau) - y(\tau))\,d\tau + Kd\frac{d(r(t) - y(t))}{dt},$$

wherein

Kp=the proportional gain, r(t)=target turbocharger inlet pressure at time t, y(t)=measured turbocharger inlet pressure by the pressure sensor at the time t, Ki=the integral gain, r(τ)=target turbocharger inlet pressure over time τ, y(τ)=measured turbocharger inlet pressure by the turbocharger inlet pressure sensor over time τ, Kd=the derivate gain, and $\dot{m}$ feedback bypass(t)=the calculated feed-back mass flow over the throttle at time the t.

By using PID regulation functionality it is possible to minimize the errors in the input to the method. How PID regulation work, and how Kp, Ki and Kd are obtained, are considered to be known to a person skilled in the art.

The following description of examples of the method is for clarification purposes only and should not be seen as limiting.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
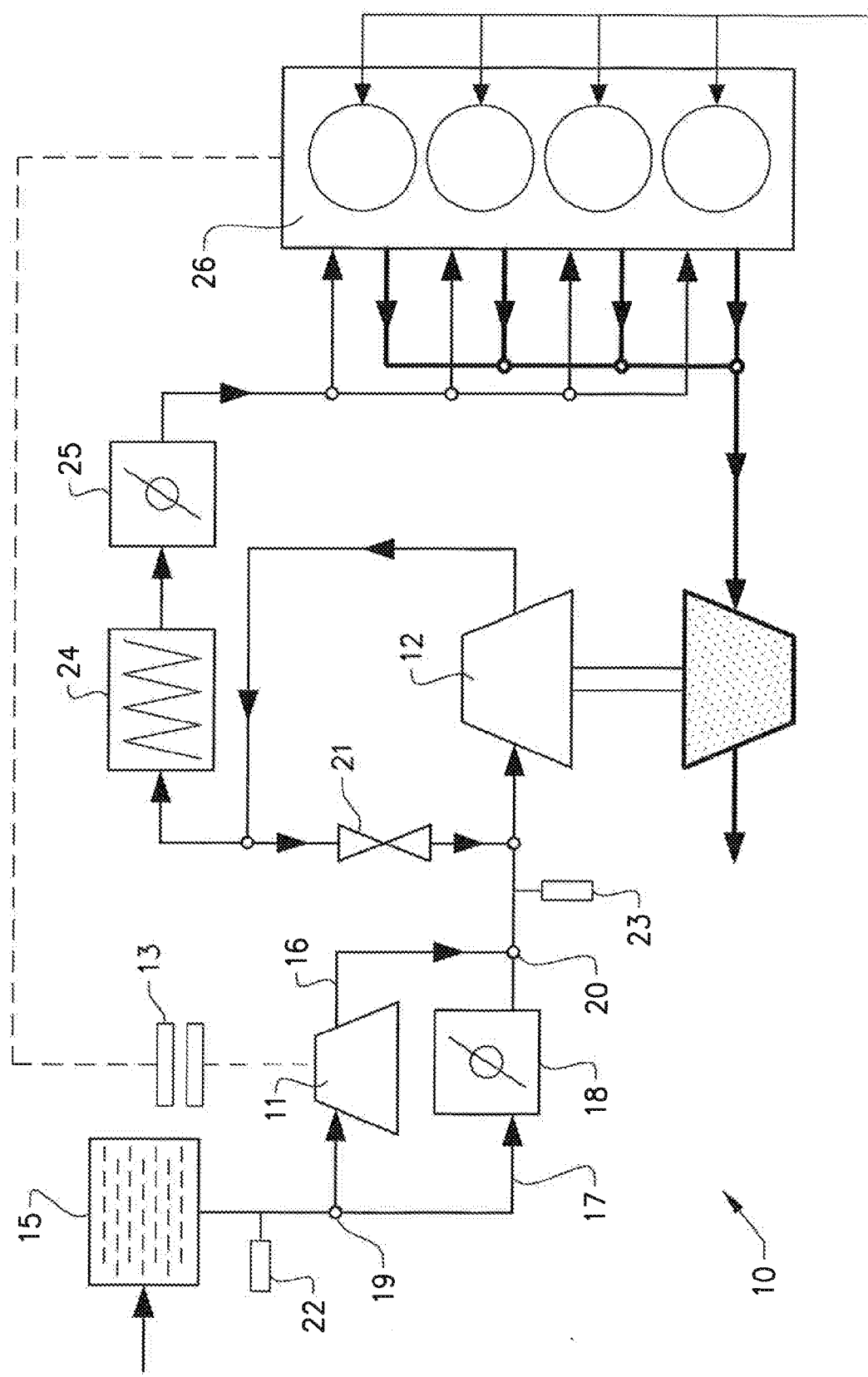
FIG. 1 shows a schematic drawing of an internal combustion engine with a compressor and a turbocharger.

FIG. 1 shows a schematic drawing of a preferred embodiment of an internal combustion engine 10 with a compressor 11 and a turbocharger 12. The compressor 11 is connected to a crankshaft of the internal combustion engine 10 via a compressor clutch 13. By engaging and disengaging the compressor clutch 13 the compressor 11 can be direct or indirectly engaged to the crankshaft of the internal combustion engine 10 and disengaged from the same respectively. When the compressor 11 is engaged to the crankshaft of the internal combustion engine 10 the crankshaft drives the compressor 11. The compressor 11 increases the air pressure or air density such that more air, hence more oxygen, is supplied to a combustion chamber of the internal combustion engine 10. The increased amount of air enables that also more fuel can be injected, resulting in that more power can be produced.

As has been stated earlier, conventionally when the compressor clutch is engaged the compressor has a significantly lower speed than the crankshaft. The big difference in speed between the crankshaft and the compressor results in that the energy that instantly needs to be transferred from the crankshaft to the compressor is significant, which can be harmful for the compressor clutch or can be limiting for when the compressor can be engaged. According to the method pre-spin is used in order to speed up the compressor before the compressor clutch is engaged. The initiation of the pre-spin operation is independent of if the compressor clutch is engaged and is entirely dependent on that a number of pre-set conditions are fulfilled. The pre-spin operation will reduce the speed differential, hence lower the energy that needs to be transferred. This will reduce the wear of the compressor clutch and may increase the maximum speed of the crankshaft at which the compressor can be engaged.

Air enters the internal combustion engine 10 via an air intake 15. The compressor 11 is arranged downstream of the air intake 15 in a compressor conduit 16. In parallel to the compressor conduit 16 is a bypass conduit 17 arranged such that the bypass conduit 17 bypasses the compressor 11. The bypass conduit 17 is provided with a bypass throttle 18. Downstream of the air intake 15 the compressor conduit 16 and the bypass conduit 17 are divided from each other in a splitting point 19. How the air mass flow from the air intake 15 will be divided between the compressor conduit 16 and the bypass conduit 17 is dependent on the back pressure of respective conduit 16, 17. The conduit 16, 17 with the lowest back pressure will be favored and will be provided with the greater part of the air mass flow of the air intake 15. By controlling the angle of the bypass throttle 18 it is possible control the back pressure of the bypass conduit 17.

Downstream of the compressor 11 and the bypass throttle 18 respectively the compressor conduit 16 and the bypass conduit 17 merges in a merging point 20. At said merging point 20 the two conduits 16; 17 merge such that the total air mass flow after the merging point 20 will be the sum of the air mass flow of the compressor conduit 16 and the air mass flow of the bypass conduit 17.

Downstream of the merger point 20 the turbocharger 12 is provided. The functionality of the turbocharger 12 is not part of the disclosure per se and will not be disclosed more in detail. Close to the turbocharger 12 a valve 21 is provided which enables that the turbocharger 12 can be bypassed.

In the conduit connecting the air intake 15 and the splitting point 19 a temperature sensor 22 is provided such that the temperature sensors 22 can measure the temperature in the air mass flow. Downstream of the merging point 20 and upstream of the turbocharger 12 a turbocharger inlet pressure sensor 23 is provided such that the pressure can be measured in the air mass flow.

As also is shown in FIG. 1, a charge air cooler 24 and a throttle 25 are provided downstream of the turbocharger 12 before an engine block 26 with the combustion chamber of the internal combustion engine 10. On the exhaust side of the engine block 26 the discharged exhaust gases enter the turbine of the turbocharger 12 as is known in the art.

Figure 2:
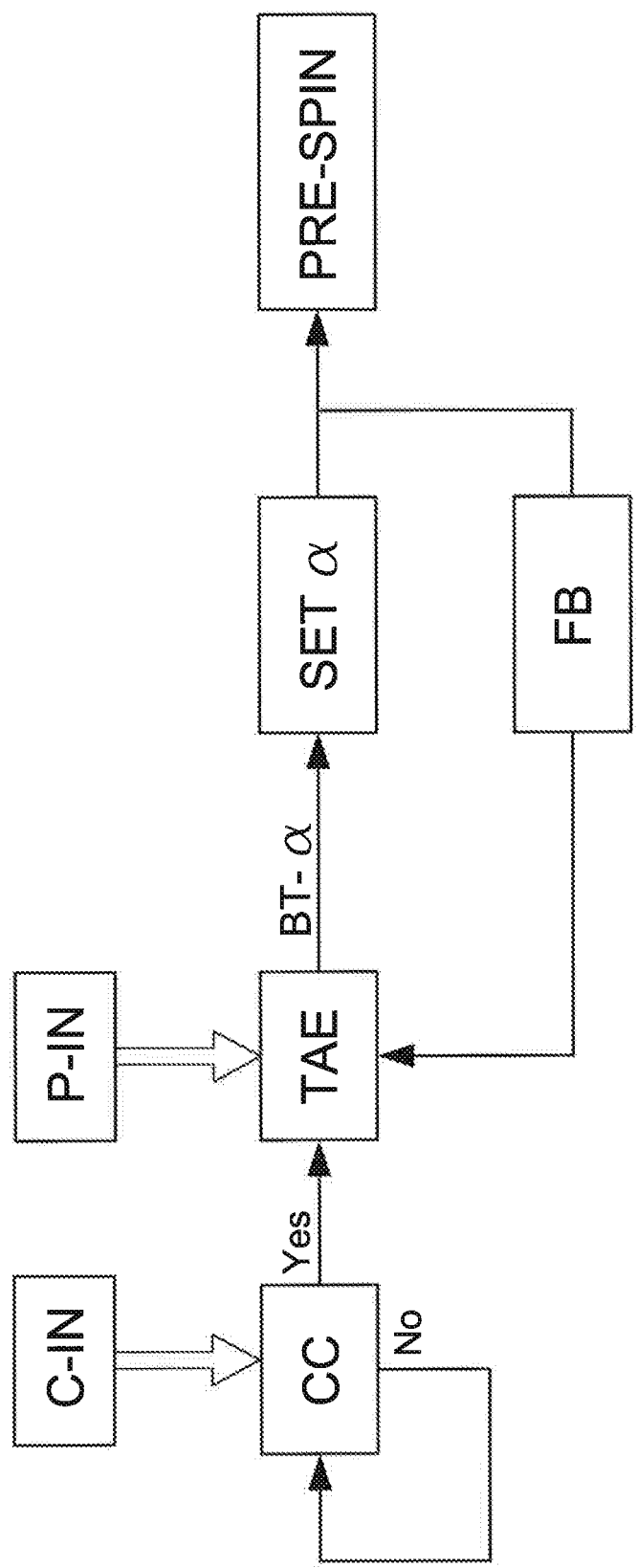
FIG. 2 shows a flowchart of a method according to the present disclosure.

Referring now to FIG. 2, showing a flowchart of a preferred embodiment of the method, controlling the preferred embodiment of an internal combustion engine disclosed in FIG. 1. The disclosure is not limited to the specific flowchart presented, but includes all variations within the scope of the present claims. The method is intended to allow the compressor of an internal combustion engine to be engaged at higher maximum crankshaft speeds and/or increase the durability of the compressor clutch for a vehicle comprising an internal combustion engine, wherein the internal combustion engine preferably comprises a compressor and a turbocharger. The compressor clutch is connecting the compressor to the crankshaft of said internal combustion engine. The wear of the clutch is proportional to the transferred energy when the clutch is engaged. According to the method the vehicle also comprises a bypass conduit, bypass-ing the compressor, in which a bypass throttle is provided such that the air mass flow in the bypass conduit can be controlled.

The reduction of energy transferred when the compressor clutch engages the compressor to the crankshaft is achieved by speeding up the compressor before it is engaged, which will reduce the differential speed between the compressor and the crankshaft once the clutch is engaged. This is referred to as pre-spin and is accomplished by controlling the air mass flow over the compressor before the compressor is engaged.

According to the method the method is initiated by a continuously performed condition check CC where a number of pre-set conditions C-IN that have to be fulfilled in order for the method to proceed continuously are evaluated. The conditions C-IN, that are used as in put to the condition check CC, and that have to be fulfilled in order for the method to be implemented may e.g., be; that the clutch has to be in a disengaged state, the internal combustion engine load must be within a predetermined range, the air mass flow delivered by the turbocharger must be within a predetermined range, the compressor speed must be below a threshold value and the bypass throttle must be at least partially open. The bypass throttle must be at least partially open since according to the method it is essential that the bypass throttle can be at least partially closed such that the air mass flow over the bypass is decreased whereas the air mass flow over the compressor is increased. This will speed up the compressor, thus pre-spin is obtained.

Also other conditions, such as that if the current gear is one of a predetermined number of gears, may be used as input C-IN to the condition check CC.

If all the conditions C-IN that are checked during the condition check CC of the method are fulfilled this indicates that the pre-spin operation should be performed and that the throttle should be at least partially closed by changing the angle of the bypass throttle. When the throttle is partially closed the air mass flow over the bypass conduit in which the bypass throttle is provided will decrease, causing the air mass flow over the compressor to increase. This will speed up the compressor.

According to one aspect of the method the bypass throttle angle is calculated by using a bypass throttle angle equation TAE. In order to calculate the bypass throttle angle a number of parameters and constants P-IN are required as input to the calculation according to the bypass throttle angle equation TAE.

According to the method a bypass throttle angle BT–α is obtained from the bypass throttle angle equation TAE. The bypass throttle will subsequently be set SET α according to the calculated bypass throttle angle BT–α. According to one example of the disclosure the bypass throttle angle is given in percentage of openness, wherein 100% indicates completely open throttle and 0% indicates fully closed throttle. However, in reality there will always be a slight leakage over the throttle and the throttle will never be 0% open.

The set bypass throttle angle BT–α significantly effects the air mass flow over the bypass throttle, hence also the air mass flow over the compressor. If the bypass throttle is fully open, hence closer to 100% open, the back pressure over the bypass throttle will be very low and it will be favorable for the air mass flow to pass over the bypass throttle. The more closed the bypass throttle is the higher will the back pressure over the bypass throttle be and at some point, which primarily is dependent on the back pressure caused by the compressor, it will be favorable for at least a part of the air mass flow to pass over the compressor, which will initiate the pre-spin operation PRE-SPIN. Consequently, by controlling the bypass throttle angle BT-α it is possible to control the air mass flow over the compressor and the throttle respectively, thus the pre-spin operation PRE-SPIN. If the bypass throttle is almost fully closed all air mass flow is forced to pass over the compressor.

According to one aspect of the method for controlling the pre-spin functionality the method comprises a feed-back functionality FB. The feed-back functionality FB is applied once the bypass throttle angle BT-α is calculated, and is intended to continuously correct the calculated bypass throttle angle BT-α. The feedback control functionality FB uses a feedback equation for calculating a calculated feedback mass flow over the throttle. According this aspect of the method the calculated feedback mass flow over the throttle is subsequently added to the current mass flow over the throttle which continuously will update the mass flow over the throttle. Since the mass flow over the throttle is used as input to the throttle position equation, a more accurately calculated mass flow over the throttle will give a more accurate bypass throttle angle for given conditions. In order to calculate the feedback mass flow over the throttle input from the turbocharger inlet pressure sensor provided downstream of the compressor is used.

By using the feed-back functionality FB of the method it is possible to continuously update the bypass throttle angle such that the air mass flow over the compressor, and thus the speed of the compressor, continuously can be corrected.

As will be realized, it is possible to modify the disclosure in various obvious respects, all without departing from the scope of the appended claims. Accordingly, the drawings and the description thereto are to be regarded as illustrative in nature, and not restrictive. Additionally, the features of various implementing embodiments may be combined to form further embodiments of the invention.

What is claimed is:

1. A method for controlling a pre-spin operation of a compressor of an internal combustion engine, wherein the internal combustion engine comprises an air intake, a compressor conduit, a bypass conduit and a turbocharger, wherein the air intake is in fluid communication with an air inlet of the turbocharger, the compressor conduit comprises a compressor and is arranged between the air intake and the turbocharger such that the compressor is in fluid communication with the air intake and the turbocharger, and the bypass conduit comprises a bypass throttle and is arranged in fluid communication with the air intake and the turbocharger inlet such that the bypass conduit bypasses the compressor, wherein a compressor clutch connects the compressor to a crankshaft of the internal combustion engine such that the compressor can be engaged and disengaged from the crankshaft, and wherein the bypass throttle can be controlled by setting a bypass throttle angle such that the bypass throttle can be controlled between an open position and a closed position, the method comprising:
   checking a number of conditions including:
      if the compressor clutch is in a disengaged state,
      if a load of the internal combustion engine is in a predetermined load range,
      if an air mass flow delivered by the turbocharger is within a predetermined mass flow range,
      if a speed of the compressor is below a threshold value, and
      if the bypass throttle is at least partially open; and
   if the conditions are fulfilled, performing the following:
   calculating a bypass throttle angle dependent on at least a mass flow over the internal combustion engine and a target pressure difference over the compressor such that a predetermined pre-spin of the compressor is achieved, the internal combustion engine load stays in the predetermined load range, and the air mass flow delivered by the turbocharger stays within the predetermined mass flow range; and
   setting the bypass throttle angle according to the calculated bypass throttle angle.

2. The method according to claim 1 wherein the internal combustion engine is connected to a transmission, and wherein the method comprises an additional condition of checking if one of a number of predefined gears of the transmission is engaged.

3. The method according to claim 2 wherein the internal combustion engine additionally comprises a temperature sensor provided downstream of the air intake and upstream of a splitting point of the compressor conduit and the bypass conduit for measuring compressor inlet temperature, wherein the method further comprises measuring a compressor inlet temperature, and wherein the calculating of the bypass throttle angle is additionally dependent on the measured temperature.

4. The method according to claim 3 wherein the calculating of the bypass throttle angle is dependent on a mass flow over the bypass throttle.

5. The method according to claim 2 wherein the calculating of the bypass throttle angle is dependent on a mass flow over the bypass throttle.

6. A vehicle comprising an internal combustion engine controlled according to the method of claim 2.

7. The method according to claim 1 wherein the internal combustion engine additionally comprises a temperature sensor provided downstream of the air intake and upstream of a splitting point of the compressor conduit and the bypass conduit for measuring compressor inlet temperature, wherein the method further comprises measuring a compressor inlet temperature, and wherein the calculating of the bypass throttle angle is additionally dependent on the measured temperature.

8. The method according to claim 7 wherein the calculating of the bypass throttle angle is dependent on a mass flow over the bypass throttle.

9. The method according to claim 8 wherein the calculating of the bypass throttle angle is performed based on the following throttle position equation:

$$BT\text{-}\alpha = f((\dot{m}\text{ engine}(t) - \dot{m}\text{ comp target}(t))^* \sqrt{RTus}/(Cd^*Pus)^*f(\text{Pratio})),$$

wherein BT-α is the bypass throttle angle, ṁ engine(t) is mass flow over the engine at time t, ṁ comp target(t) is requested mass flow over the compressor at time t, R is the gas constant, approximately 287 J/KgK, Tus is the temperature measured by the temperature sensor upstream of the compressor, Cd is discharge coefficient for the bypass throttle, Pus is requested pressure downstream of a merging point of the compressor conduit and the bypass conduit, and Pratio is target pressure difference over the compressor.

10. The method according to claim 9 wherein the method additionally comprises using a feedback functionality such that the mass flow over the bypass throttle continuously can be updated, wherein the feedback functionality comprises:
   calculating a feedback mass flow over the throttle (ṁ feedback bypass(t)),
   adding the calculated feedback mass flow over the throttle (ṁ feedback bypass(t)) to the current mass flow over the throttle ($\dot{m}$ bypass(t)) such that a corrected mass flow over the throttle $\dot{m}$ bypass(t+1)) is calculated according to:

$$\dot{m}\ \text{bypass}(t+1) = \dot{m}\ \text{bypass}(t) + \dot{m}\ \text{feedback bypass}(t).$$

11. The method according to claim 10 wherein the internal combustion engine additionally comprises a turbocharger inlet pressure sensor provided downstream of the merging point where the compressor conduit and the bypass conduit merge and upstream of the turbocharger for measuring a turbocharger inlet pressure, and wherein the method further comprises:
   measuring the turbocharger inlet pressure (y(t)),
   calculating the feedback mass flow over the throttle ($\dot{m}$ feedback bypass(t)) by using the following feedback equation:

$$\dot{m}\ \text{feedback bypass}(t) = Kp(r(t)-y(t)) + \int_0^t Ki(r(\tau)-y(\tau))\,d\tau + Kd\frac{d(r(t)-y(t))}{dt},$$

wherein Kp=proportional gain, r(t)=target turbocharger inlet pressure at time t, y(t)=measured turbocharger inlet pressure by the pressure sensor at time t, Ki=integral gain, r(τ)=target turbocharger inlet pressure over time τ, y(τ)=measured turbocharger inlet pressure by the turbocharger inlet pressure sensor over time τ, Kd=derivate gain, and $\dot{m}$ feedback bypass(t)= the calculated feedback mass flow over the throttle at time t.

12. A vehicle comprising an internal combustion engine controlled according to the method of claim 9.

13. The method according to claim 8 wherein the method additionally comprises using a feedback functionality such that the mass flow over the bypass throttle continuously can be updated, wherein the feedback functionality comprises:
   calculating a feedback mass flow over the throttle ($\dot{m}$ feedback bypass(t)),
   adding the calculated feedback mass flow over the throttle ($\dot{m}$ feedback bypass(t)) to the current mass flow over the throttle ($\dot{m}$ bypass(t)) such that a corrected mass flow over the throttle $\dot{m}$ bypass(t+1)) is calculated according to:

$$\dot{m}\ \text{bypass}(t+1) = \dot{m}\ \text{bypass}(t) + \dot{m}\ \text{feedback bypass}(t).$$

14. The method according to claim 13 wherein the internal combustion engine additionally comprises a turbocharger inlet pressure sensor provided downstream of a merging point where the compressor conduit and the bypass conduit merge and upstream of the turbocharger for measuring a turbocharger inlet pressure, and wherein the method further comprises:
   measuring the turbocharger inlet pressure (y(t)),
   calculating the feedback mass flow over the throttle ($\dot{m}$ feedback bypass(t)) by using the following feedback equation:

$$\dot{m}\ \text{feedback bypass}(t) = Kp(r(t)-y(t)) + \int_0^t Ki(r(\tau)-y(\tau))\,d\tau + Kd\frac{d(r(t)-y(t))}{dt},$$

wherein Kp=proportional gain, r(t)=target turbocharger inlet pressure at time t, y(t)=measured turbocharger inlet pressure by the pressure sensor at time t, Ki=integral gain, r(τ)=target turbocharger inlet pressure over time τ, y(τ)=measured turbocharger inlet pressure by the turbocharger inlet pressure sensor over time τ, Kd=derivate gain, and $\dot{m}$ feedback bypass(t)= the calculated feedback mass flow over the throttle at time t.

15. A vehicle comprising an internal combustion engine controlled according to the method of claim 14.

16. A vehicle comprising an internal combustion engine controlled according to the method of claim 13.

17. A vehicle comprising an internal combustion engine controlled according to the method of claim 7.

18. The method according to claim 1 wherein the calculating of the bypass throttle angle is dependent on a mass flow over the bypass throttle.

19. A vehicle comprising an internal combustion engine controlled according to the method of claim 18.

20. A vehicle comprising an internal combustion engine controlled according to the method of claim 1.

* * * * *